United States Patent [19]

McCullough, Jr.

[11] Patent Number: 4,588,775
[45] Date of Patent: May 13, 1986

[54] HIGH TOUGHNESS PROPYLENE POLYMER COMPOSITIONS

[75] Inventor: J. Douglas McCullough, Jr., Houston, Tex.

[73] Assignee: Shell Oil Company, Houston, Tex.

[21] Appl. No.: 623,697

[22] Filed: Jun. 22, 1984

[51] Int. Cl.[4] ............................................. C08L 53/00
[52] U.S. Cl. ...................................... 525/88; 525/97; 525/106; 525/211; 525/240; 524/261
[58] Field of Search .................. 525/88, 240, 97, 106, 525/211; 524/269, 261

[56] References Cited

U.S. PATENT DOCUMENTS

| | | | |
|---|---|---|---|
| 3,200,173 | 8/1965 | Schilling | 260/878 |
| 3,207,739 | 9/1965 | Wales | 260/93.7 |
| 3,268,499 | 8/1966 | Wales | 260/93.7 |
| 3,318,976 | 5/1967 | Short | 260/878 |
| 3,514,501 | 5/1970 | Liebson et al. | 260/878 |
| 4,140,732 | 2/1979 | Schnetger et al. | 525/88 |
| 4,287,108 | 9/1981 | Grigo et al. | 524/269 |
| 4,292,222 | 9/1981 | Grigo et al. | 524/269 |
| 4,375,531 | 3/1983 | Ross | 525/93 |
| 4,459,385 | 7/1984 | McCullough, Jr. | 525/88 |

FOREIGN PATENT DOCUMENTS 173145  10/1983  Japan ..................... 525/88

Primary Examiner—Lewis T. Jacobs
Assistant Examiner—Robert E. L. Sellers
Attorney, Agent, or Firm—Dean F. Vance

[57] ABSTRACT

Blends of sequentially polymerized ethylene-propylene copolymers, high density ethylene homopolymers, EPM or EPDM rubber and linear low density polyethylene possess extremely good impact resistance.

17 Claims, No Drawings

HIGH TOUGHNESS PROPYLENE POLYMER COMPOSITIONS

FIELD OF THE INVENTION

This invention relates to modified propylene polymer compositions of improved impact resistance. More particularly, the invention relates to blends of sequentially polymerized propylene copolymers with high density ethylene homopolymers, linear low density ethylene copolymers and certain rubbers.

BACKGROUND OF THE INVENTION

Polypropylene is a well known commercial polymer, used for a variety of products such as packaging films and extruded and molded shapes. It is produced by polymerization of propylene over transition metal coordination catalysts, specifically titanium halide containing catalysts. Commercial polypropylene is deficient in resistance to impact at low temperatures, i.e., 0° C. and below. It is known that incorporation of some elastomers, particularly elastomeric copolymers of ethylene and propylene, improves the low temperature impact resistance of polypropylene.

One method of incorporating elastomeric ethylene-propylene copolymers into polypropylene is by sequential polymerization of propylene and ethylene-propylene mixtures. In typical processes of this kind, propylene homopolymer is formed in one stage and the copolymer is formed in a separate stage, in the presence of the homopolymer and of the original catalyst. Multiple stage processes of this type are also known. Products of such sequential polymerization processes are sometimes referred to as "block copolymers" but it is now understood that such products may rather be intimate blends of polypropylene and ethylene-propylene elastomer. The products of such sequential polymerization of propylene and ethylene-propylene mixtures, are referred to herein as sequentially polymerized propylene-ethylene copolymers or as in-situ produced copolymers. To maintain separate terminology for the total sequentially polymerized copolymer composition and the elastomeric copolymer fraction thereof, the total copolymer composition is referred to as impact-improved propylene-ethylene copolymer which has a specified content of an elastomeric ethylene-propylene copolymer fraction and which is the product of sequential polymerization of propylene and a propylene-ethylene mixture.

Methods for producing impact-improved, sequentially polymerized propylene-ethylene copolymers are well known. See, for example, *"Toughened Plastics"* by C. B. Bucknall, Applied Science Publishers Ltd. 1977, pp. 87–90, and T. G. Heggs in *Block Copolymers*, D. C. Allport and W. H. James (eds), Applied Science Publishers Ltd. 1973, chapter 4. Representative U.S. patents describing such methods are: U.S. Pat. Nos. 3,200,173—Schilling; 3,318,976—Short; and 3,514,501—Leibson et al.

These impact-improved, sequentially polymerized propylene-ethylene copolymers are sometimes blended with other polymers to improve certain properties. In some cases these impact copolymers are blended with polymers such as high density polyethylene (HDPE) or low density polyethylene (LDPE). See, e.g., the patents cited in the Description of the Prior Art in copending patent application, Ser. No. 444,754, filed Nov. 26, 1982, having a common assignee, and U.S. Pat. No. 4,375,531. The blends covered in the above-mentioned patent application are blends of impact propylene copolymers and linear-low density ethylene copolymers. Such blends have excellent falling weight impact resistance without excessive loss of stiffness. However, such blends, like most commercial impact polypropylenes, still do not have high notched impact resistance. A new composition has now been found that does possess unexpectedly high notched impact resistance.

SUMMARY OF THE INVENTION

The present invention deals with compositions having unexpected and excellent notched impact strength (even at low temperature) along with good overall toughness. Specifically, the present invention deals with compositions having melt flows between about 0.5 and about 30 dg/min (ASTM D1238-Condition L), and high notched impact values, said compositions being obtained by blending 50–96% by weight of an impact-modified propylene polymer, 2 to 45% by weight of a high density ethylene homopolymer, 2 to 45% by weight of a linear low density ethylene copolymer, and 0 to 30% by weight of a rubber selected from the group consisting of ethylene-propylene rubber and ethylene-propylene-diene monomer rubber, wherein:

(a) said impact-modified propylene polymer has a melt flow (ASTM D1238-Condition L) of about 0.5–30 dg/min and an elastomeric propylene-ethylene copolymer content of 5–50% by weight, the copolymer fraction having an ethylene content of 30–95% by weight, which copolymer fraction is the product of an essentially random polymerization of a propylene-ethylene mixture over a titanium halide-containing coordination catalyst;

(b) said high density ethylene homopolymer has a density in the range from 0.941 to 0.965 g/cc and a melt index (ASTM D1238 Cond. E) in the range from 0 to 20 dg/min;

(c) said linear low density ethylene copolymer is the product of random polymerization of ethylene with up to 15 mole percent of at least one $C_3$–$C_8$ alpha olefin monomer over a transition metal-based coordination catalyst and which has a density in the range from 0.912 and 0.935 g/cc and a melt index (ASTM D-1238-Condition E) not exceeding 16; and (d) the weight ratio of high density ethylene homopolymer to linear low density ethylene copolymer is between 80:20 and 20:80.

In a preferred embodiment, the various modifiers (LLDPE, HDPE, rubber) are blended together in a masterbatch, and the masterbatch is lightly crosslinked with a peroxide.

In an alternative embodiment, said LLDPE and HDPE to be used in combination for impact modification may be pre-combined by melt mixing, physical blending, or through slurry mixing within a process train so designed as to make both types of polyethylene independently. Also, the HDPE, rubber and LLDPE may be separately added to the impact-modified propylene copolymer as one chooses in melt compounding equipment, including that used for final product fabrication.

As shown in the examples which follow, compositions according to this invention have unexpectedly high notched impact strength. The significance of improved notched impact strength lies in expectations for improved toughness for a variety of molded parts having sharp radii, grained or grooved/ribbed surfaces, etc. Hence, a notch resistant PP should open doors to greater part design flexibility.

DESCRIPTION OF THE INVENTION

This invention is directed to modified polypropylene polymer molding compositions which provide good impact resistance at acceptable levels of stiffness in extruded or injection molded articles.

Before discussing the invention further, reference is made to the methods of measuring impact resistance and stiffness, employed in this description.

Impact resistance may be measured by a variety of methods. A frequently employed method is the notched Izod impact test (ASTM D-256). Until now, the generally low notched impact strength of even impact-improved polypropylene has been a matter of record, and the industry has designed parts such that sharp radii and grained or grooved surfaces are generally minimized. Hence, falling weight impact has historically been the primary indicator of toughness, and it remains a key discriminator between materials. The falling weight method employed in this description is the Gardner impact test. In that method an impacting device having a ⅝ inch diameter rounded tip rests on the injection molded circular sample disk (125 mil thick) which is supported at the rim. The sample disk is one of a series from the same composition, which has, in this case, been cooled to −30° C. A weight is dropped on the impacting device from a variable measured height. The sample disk is replaced after each drop; the height from which the weight is dropped is varied until the breaking point of the series of disks is defined. The impact strength, reported in units of Joules, ft-lbs or in-lbs, is the product of the mass of the dropped weight and the height of drop at which 50% of the disks resist breaking.

The stiffness of test strips molded from various compositions is reported as the 1% secant flexural modulus, determined in a standard test (ASTM D790) performed at 0.05 inch per minute. Flexural modulus may be reported in units of megapascals (MPa) or pounds per square inch (psi).

As described in the prior art, it is known that the low temperature impact resistance of propylene homopolymers is deficient for uses where articles may be exposed to temperatures of 0° C. or below. Commercially, low temperature impact resistance of propylene polymers is improved by blending polypropylene homopolymers with certain elastomers, particularly ethylene-propylene copolymers, or with mixtures of such elastomers with high density polyethylene, or by introducing ethylene-propylene elastomer into the propylene polymer during polymerization by a sequential polymerization process. As a general rule, impact resistance increases with increasing amounts of elastomer in the total composition. One of the adverse effects of the addition of ethylene-propylene elastomer is the concomitant reduction in stiffness of the product, stiffness being one of the attractive properties of propylene homopolymer. The balance of impact and stiffness is critical in the judging of the performance of polypropylene molding and extrusion compositions. Even though the admixture of polyethylene to improve the impact resistance of polypropylene compositions, including sequentially polymerized propylene-ethylene copolymers, has been disclosed in patents issued as early as 1966, such compositions have apparently found no practical use in commerce.

Impact improved propylene polymers are often referred to in the trade as "medium impact", "high impact", and "extra/sugar high impact" polypropylene. Typical ranges of properties for commercial products of this type are as follows:

| Property | Medium Impact | High Impact | Extra/Super High Impact |
|---|---|---|---|
| 1% Secant flexural modulus, MPa | 1000–1430 | 800–1200 | 700*–1100 |
| Impact Strength (125 mil disks) Gardner at −30° C., J | 1–15 | 15–30 | 30–45 |
| Izod, notched, at 23° C., J/m | 60–100 | 100–300 | 300-No break* |

*Commercially available polypropylenes having higher notched Izods, including "no break" values, tend to be low stiffness products, which as a consequence, have not received broad industry acceptance. Such products are not represented in this disclosure.

Sequentially polymerized propylene-ethylene copolymers which are improved according to this invention are materials of commerce. They may be produced by sequential polymerization of propylene and propylene-ethylene mixtures by contact with Ziegler-Natta coordination catalysts, specifically those in which the transition metal is titanium, by well known methods. Such methods are described, for example, in the literature cited above. The catalysts generally employed in commercial processes are combinations of a violet $TiCl_3$ composition with an aluminum alkyl compound such as diethyl aluminum chloride. Newer types of coordination catalysts, such as compositions of $TiCl_4$ supported on magnesium chloride and modified with an electron donor, which are used with an aluminum trialkyl cocatalyst and a selectivity control agent such as an aromatic ester, may also be used to produce the sequentially polymerized copolymers.

The sequentially polymerized propylene-ethylene copolymers should have compositions and properties in the following ranges:

|  | Suitable | Preferred | Best |
|---|---|---|---|
| Homopolymer, % Weight | 50–95 | 80–95 | 85–92 |
| Ethylene-Propylene Copolymer, % Weight | 50–5 | 25–10 | 20–15 |
| Ethylene Content of Copolymer Fraction, % Weight | 30–95 | 40–70 | 45–65 |
| Melt Flow, dg/min | .5–30 | .5–15 | .5–12 |

"High density polyethylenes" (HDPE), typically having densities in the range of 0941 to 0.965 g/cc, may be produced by means of transition metal catalysts of the Ziegler-Natta type or Phillips Petroleum Company's chromia type in processes operating at relatively low pressures. They may also be referred to as low pressure polyethylenes. HDPEs are characterized by linearity and crystallinity. Minor amounts of typically butene-1 or other alpha-olefin monomer may be copolymerized with the ethylene in order to improve stress crack resistance. Preferably, the HDPE has a low melt index below about 12, more preferably between about 0.1 and about 3.0.

Linear low-density polyethylenes which may be blended with said propylene-ethylene copolymers, rubbers and high density ethylene homopolymers according to this invention are random copolymers of ethylene with 1–15 mole percent, and typically with no more than 10%, of higher alpha-olefin co-monomer, e.g., propylene, n-butene-1, n-hexene-1, n-octene-1 or 4-methylpentene-1, produced over transition metal coordination catalysts. As shown in the examples which follow, a much preferred comonomer is 1-butene, although other mentioned co-monomers are useful, and mixtures thereof may be beneficial. Such polymers are commercially available. Commercial products generally are produced in liquid phase or vapor phase polymerization processes. LLDPE polymers suitable for use in this invention should have properties in the following ranges:

|  | Suitable | Preferred | Best |
|---|---|---|---|
| Melt Index, dg/min (ASTM D1238 Cond. E) | 0.1–16 | 0.1–12 | 0.1–2 |
| Density, g/cc | 0.912–0.935 | 0.917–0.935 | 0.917–0.925 |
| Tensile Properties (ASTM D638) | | | |
| Yield, MPa | 8–17 | 8–15 | 8–12 |
| Break, MPa | 8–25 | 10–25 | 15–25 |
| Elongation at Break, % | 100–1200 | 400–1200 | 600–1200 |
| Brittleness Temp., °C. | below −80 | below −80 | below −80 |

The rubber employed is selected from the group consisting of ethylene-propylene copolymer rubber (EPR or EPM), ethylene-propylene-diene monomer terpolymer rubber (EPDM) and mixtures thereof with EPR being preferred. The ethylene-propylene copolymer, typified by saturated EPM, and the ethylene-propylene-diene terpolymer, typified by unsaturated EPDM, are commercially available and methods for their preparation are well known in the art as shown in, for example, U.S. Pat. No. 4,033,889. Suitable copolymers contain from about 30 to 85 weight percent, preferably 40 to 70 weight percent, of ethylene. Suitable terpolymers contain from about 30 to 85 weight percent, preferably about 40 to 70 weight percent, of ethylene, from about 14 to 70 weight percent, preferably about 30 to 60 weight percent, of propylene, and from about 0.2 to 10 weight percent, preferably about 1 to 3 weight percent of a non-conjugated diene or mixture thereof. The preferred dienes are 1,4-hexadiene, 5-ethylidene-2-norbornene and dicyclopentadiene, with 1,4-hexadiene more preferred.

The blended compositions of this invention contain sequentially polymerized propylene-ethylene copolymer, high density ethylene homopolymer (HDPE) and LLDPE in the following proportions:

|  | Suitable | Preferred | Best |
|---|---|---|---|
| Copolymer % w | 50–96 | 70–90 | 75–90 |
| HDPE % w | 2–45 | 3–25 | 3–20 |
| LLDPE % w | 2–45 | 3–25 | 5–20 |
| Rubber % w | 0–30 | 0–10 | 2–8 |

It will be understood that the proportions of components as well as the properties of the blended components may be selected to provide the best balance of properties and cost for any particular intended use. In some cases a lower performance level may be relatively satisfactory and may be commercially preferred if it can be achieved at a lower cost. Generally, the cost of LLDPE and HDPE is lower than that of sequentially polymerized propylene-ethylene copolymer or EPM/EPDM rubber.

Another important aspect of the present invention is the weight ratios of HDPE to LLDPE. The weight ratio should be between 80:20 and 20:80, and the best ratio is at about 30% HDPE-70% LLDPE. This weight ratio is important because it relates to notched Izod toughness.

In a preferred embodiment, the various modifier components (HDPE, LLDPE and rubber) are blended together in a masterbatch prior to blending with the impact PE copolymer. Further, it is preferred that this masterbatch be lightly crosslinked with a peroxide in order to enhance impact properties. Lightly crosslinking means peroxide-reacting or peroxide-contacting the masterbatch such that the desired crosslinks are formed in the absence of extensive gel formation.

Peroxide-reacting or peroxide-contacting refers to the process of contacting the masterbatch or individual components (rubber, HDPE and LLDPE) in an extruder in the presence of a small but effective amount of a free-radical initiator (i.e., a peroxide). Standard techniques for the peroxide crosslinking of polymers in an extruder are well known and include the processes disclosed in U.S. Pat. No. 3,144,436 and U.S. Pat. No. 3,887,534. Preferred peroxides are those which have relatively high decomposition temperatures and produce volatile decomposition products, the latter being relatively non-toxic and with minimal residual odor. The peroxide of choice is 2,5-dimethyl-2,5-bis(t-butylperoxy)hexane (PX-1). Other peroxides of interest include those which have half-lives of decomposition of the order of seconds at the reaction temperature (about 230° C.) but which are safely stable at storage and ambient temperatures. Decomposition products should preferably be volatile and relatively non-toxic. Many peroxides fit this category and choice is determined by economic considerations and physical form of the peroxide relative to efficiency of utilization. Many of the peroxides that are compatible with this invention are dialkyl peroxides but are not limited to this class. Specific examples are dicumyl peroxide, di-t-butyl peroxide, t-butyl cumyl peroxide and 2,5-dimethyl-2,5-bis(t-butylperoxy)hexyne-3. If desired, the peroxide may be added in a masterbatch with mineral oil or other polymer. Typical amounts of peroxide are between about 150 parts by weight per million parts by weight (ppmw) total added polymer modifier and about 1500 ppmw, preferably between about 300 ppmw and about 700 ppmw. Typical contacting temperatures are between about 190° C. and about 260° C., preferably between about 220° C. and about 240° C.

Good properties may be obtained by pre-dispersion of the polyethylenes and rubber in a first melt compounding step followed by a second melt compounding step wherein the peroxide treatment takes place. It is understood that this sequence of melt compounding steps could be effected in one suitably equipped melt compounding machine.

The peroxide is usually included in a melt compounding step in which the HDPE, rubber and LLDPE are pre-mixed to form a masterbatch. Crosslinking, rather than visbreaking, is the major chemical transformation. Notched Izod impact of the product of melt compounding the masterbatch with the propylene copolymer is improved relative to compositions wherein the masterbatch is not crosslinked.

The compositions of this invention may of course contain stabilizers and additives conventionally employed in similar polyolefin compositions, such as antioxidants, stabilizers against actinic radiation, antistatic additives, crystallinity nucleating agents, pigments and mineral fillers.

There are also advantages in certain cases in adding a nucleating agent, nucleation being a process well known in the art. See, e.g., U.S. Pat. Nos. 3,207,739 and 3,268,499, which are herein incorporated by reference. Acceptable nucleating agents include metal benzoates and alkyl substituted metal benzoates. Specific nucleating agents include sodium benzoate, aluminum benzoate, lithium benzoate, and magnesium benzoate, with sodium benzoate being most preferred. The amount of nucleating agent employed where desired is between about 0.01 and 2.0 percent by weight of the total composition, preferably between 0.03 and 0.2 percent by weight.

The compositions of the invention are suitable for the same uses as the commercially used impact-improved polypropylenes, e.g., for automobile trim parts, battery containers, tote boxes, crates, bottles, appliance parts and the like.

Several different propylene-ethylene sequential copolymer base stocks and LLDPEs were employed in the examples. The three base stocks are described below in Table 1. Four different LLDPEs were employed in the examples; as defined in Table 2 below:

TABLE 1

| PP # | Copolymer Fraction, % | Ethylene Content of Copolymer Fraction, % w | Melt Flow, dg/min ASTM D-1238 Cond. L |
|---|---|---|---|
| PP-1 | 13 | 53 | 4.9 |
| PP-2 | 14 | 51 | 3.5 |
| PP-3 | 15 | 51 | 4.2 |

TABLE 2

| PE # | Melt Index (ASTM D-1238 Cond. E), dg/min | Co-monomer type | Density g/cc |
|---|---|---|---|
| PE-1 | 1 | butene-1 | 0.918 |
| PE-2 | 1 | octene-1 | 0.920 |
| PE-3 | 2.3 | octene-1 | 0.917 |
| PE-4 | 0.5 | butene-1 | 0.918 |

ILLUSTRATIVE EMBODIMENT #1

Illustrative Embodiment #1 shows the remarkable notched toughness obtained with compositions according to this invention.

The polyethylene modifiers for this illustration were prepared by extruding dry mixtures of appropriate compositions on a 1-inch Killion extruder (500° F.; ca. 1800 psi back pressure). These pelletized modifiers were then let-down at 15 or 20%w in the PP-3 base copolymer. Table 1 includes results of testing these formulations, including those for which peroxide was added in masterbatching (Nos. 3, 4), or a silicone fluid was similarly added in masterbatching (Nos. 5, 6).

As is evident from Table 1, the best notched impact (Izod at 23° C.) data are associated with materials for which the pre-extruded mixed polyethylene modifier was used at 20%w and the modifier composition was 70%w LLDPE and 30%w HDPE. For these materials (Nos. 2, 4, 6) the notched Izods were truly extraordinary in that all exhibited non-break values (previously unheard of for polypropylene of modulus over 830 MPa≅120,000 psi). With peroxide treatment in the masterbatching stage, non-breaks (three out of five specimens) were even seen at the 15%w modifier level (No. 3). Similar performance was also seen with silicone treatment (No. 5). Both the modifier crosslinking with peroxide and the silicone treatment were somewhat detrimental to Gardner falling weight toughness at 20%w modification (compare Nos. 4 and 6 to 2). Base copolymer properties can affect the overall property envelope, with copolymer rubber content ($F_c$) and melt flow being most critical. Improvements in Gardner toughness are seen with increasing $F_c$ and decreasing copolymer melt flow for a given modifier system. This will be evidenced in following illustrations. In the present instance, the base copolymer used (PP-3) had an $F_c$ of 15%w and a melt flow of 4.2 dg/min. In addition, polyethylene selection also appears important, and lower melt index polyethylenes such as those used in this work are considered best based on available data. Specifically, No. 9 containing 0.5 melt index PE-4 LLDPE is better in Gardner and Izod toughness than the analogous No. 8 based on 1 melt index PE-2.

Although the finding of enhanced notched Izod toughness for mixed LLDPE-HDPE modification (over either LLDPE or HDPE modification) is clearly indicative of a synergistic interaction between the two polyethylenes, no synergisms were apparent from the other properties, including Gardner falling weight toughness, and flexural stiffness.

TABLE 1

PRODUCT DATA

| NO. | PRODUCT MODIFIER COMPOSITION[a] HDPE[b] % w | LLDPE[c] % w | Perox Conc.[d] % w | DCF[e] % w | MODIFIER CONTENT[f] % w | PRODUCT MELT FLOW dg/min | FLEX. MOD. 0.05 in/min MPa Tan. | FLEX. MOD. 0.05 in/min MPa 1% Sec. | IZOD IMPACT (NOTCHED)[g] 23° C. J/m | IZOD IMPACT (NOTCHED)[g] 0° C. J/m | IZOD IMPACT (NOTCHED)[g] −18° C. J/m | GARDNER IMPACT (125 mil DISK) −30° C. J (in-lb) |
|---|---|---|---|---|---|---|---|---|---|---|---|---|
| 1 | 30.0 | 70.0 | — | — | 15 | 3.1 | 1080 | 1030 | 250 (⅓ PB) | 51 | 37 | 22.6 (200) |
| 2 | 30.0 | 70.0 | — | — | 20 | 2.8 | 1070 | 1000 | 5NB | 58 | 39 | 27.1 (240) |
| 3 | 29.7 | 69.3 | 1 | — | 15 | 2.7 | 1060 | 1010 | 170 (2H; 3NB) | 57 | 37 | 20.0 (177) |
| 4 | 29.7 | 69.3 | 1 | — | 20 | 2.4 | 1010 | 974 | 5NB | 67 | 43 | 21.1 (186) |
| 5 | 29.7 | 69.3 | — | 1 | 15 | 2.8 | 1100 | 1040 | 360 (2H; 3NB) | 61 | 38 | 18.4 (163) |
| 6 | 29.7 | 69.3 | — | 1 | 20 | 2.5 | 1050 | 990 | 5NB | 73 | 41 | 22.0 (195) |
| 7 | 50.0 | 50.0 | — | — | 20 | 2.8 | 1050 | 993 | 490 (5PB) | 53 | 34 | 21.8 (193) |
| 8 | 70.0 | 30.0 | — | — | 20 | 2.9 | 1030 | 979 | 260 (3H; 2PB) | 51 | 34 | 23.2 (205) |
| 9 | 70.0 | 30.0[h] | — | — | 20 | 2.6 | 1100 | 1060 | 300 (3H; 2PB) | 58 | 43 | 28.2 (250) |
| 10 | 100.0 | — | — | — | 15 | 2.9 | 1270 | 1170 | 120 (5H) | 46 | 32 | 22.0 (195) |

TABLE 1-continued

PRODUCT DATA

| | PRODUCT MODIFIER COMPOSITION[a] | | | | MODI-FIER CON-TENT[f] | PRO-DUCT MELT FLOW | FLEX. MOD. 0.05 in/min MPa | | IZOD IMPACT (NOTCHED)[g] | | | GARDNER IMPACT (125 mil DISK) −30° C. |
|---|---|---|---|---|---|---|---|---|---|---|---|---|
| NO. | HDPE[b] % w | LLDPE[c] % w | Perox Conc.[d] % w | DCF[e] % w | % w | dg/min | Tan. | 1% Sec. | 23° C. J/m | 0° C. J/m | −18° C. J/m | J (in-lb) |
| 11 | 100.0 | — | — | — | 20 | 2.5 | 1200 | 1140 | 160 (5PB) | 47 | 34 | 25.2 (223) |
| 12 | — | 100.0 | — | — | 15 | 3.4 | 1010 | 960 | 150 | 47 | 35 | 24.7 (218) |
| 13 | — | 100.0 | — | — | 20 | 3.5 | 902 | 854 | 460 (5PB) | 62 | 36 | 26.6 (236) |
| 14 | Base Copolymer - PP-3 | | | | | 4.2 | 1160 | 1100 | 82 | 32 | 21 | 2.4 (21.4) |

[a]Modifiers containing both HDPE and LLDPE, possibly with peroxide concentrate or silicone fluid, were pre-extruded on a 1-inch Killion extruder (500° F.; 1800 psi back pressure). Percent of each polyethylene in the modifier is shown, and 100% w indicates only that polyethylene is used for the particular product.
[b]HDPE (density = 0.960 g/cc and melt index = 0.3 dg/min).
[c]PE-2.
[d]LDPE-based peroxide concentrate (4.6% w active PX-1 peroxide). The concentrate was added 1% w basis the polyethylene portion of the product for Nos. 3 and 4.
[e]Dow Corning 200 silicone fluid; 30,000 cs viscosity. It was added 1% w basis the polyethylene portion of the product for Nos. 5 and 6.
[f]Modifier level in final product.
[g]Notched Izod impact strengths were measured in accordance with ASTM D256, with the convention that letter symbols stand for: H = hinge break, PB = partial break, NB = non-break. Numbers in front of symbols stand for the number of breaks of the indicated type, i.e., the number or fraction of specimens that broke in the manner given. When the break is of an intermediate type (see Tables 2, 3) its combinatory nature is indicated as for example H/PB.
[h]PE-4.

ILLUSTRATIVE EMBODIMENT #2

In this illustration it is shown that use of a lower rubber content ($F_c$) copolymer (PP-1) and higher melt index polyethylenes (LLDPE and HDPE) leads to reduced notched Izod impact enhancements and generally mediocre Gardner falling weight impact values. Masterbatch modifiers were prepared as in Illustrative Embodiment #1, with the inclusion of peroxide crosslinking in one instance. Properties for the various blends of modifier with base copolymer are displayed in Table 2. It is seen that mixed polyethylene modification led to diverse results, depending on (a) level of modifier, (b) the use of peroxide crosslinking in preparing a mixed polyethylene masterbatch (Nos. 3, 4), and (c) whether the polyethylenes are added separately or in a masterbatch (compare Nos. 2 and 5). Peroxide crosslinking within the masterbatch led to notched Izod enhancement (over either HDPE or LLDPE modification). A similar Izod improvement was produced through separate addition of the polyethylenes, and this finding suggests perhaps a similar morphology resulted; however, the finding of no Izod enhancement and reduced Gardner toughness for the uncrosslinked masterbatch analogue (No. 2) of Nos. 4 and 5 very likely shows a high sensitivity to morphological factors. Again, such property instabilities were not seen when the copolymer rubber content was 15%w (PP-3) as compared to the 13%w of rubber in PP-1, and when the polyethylene melt indecies were 1 dg/min or less. Indeed, it is readily evident from Table 2 that the ca. 2 melt index LLDPE used (PE-3) was only effective in Gardner toughening at 20%w in the product (No. 10) and the 2 melt index HDPE was ineffective as a modifier over the 15 to 20%w modifier range (Nos. 6, 7). In contrast, only 10%w of the 1 melt index PE-1 LLDPE as a modifier was relatively effective in Gardner toughening (No. 11).

TABLE 2

PRODUCT DATA

| No. | MODIFIER COMP.[a] | | | PRODUCT MODIFIER CONTENT[e] % w | MELT FLOW dg/min | FLEX. MOD. 0.05 in/min MPa | |
|---|---|---|---|---|---|---|---|
| | HDPE,[b] % w | LLDPE,[c] % w | PEROX. CONC.,[d] % w | | | Tan. | 1% Sec |
| 1 | 25 | 75 | — | 15 | 4.3 | 1050 | 993 |
| 2 | 25 | 75 | — | 20 | 4.2 | 987 | 928 |
| 3 | 25 | 75 | 1 | 15 | 3.9 | 1030 | 980 |
| 4 | 25 | 75 | 1 | 20 | 3.7 | 1020 | 983 |
| 5 | — | 100[g] | — | 15 } 20 | 4.3 | 1020 | 958 |
| | 100[g] | — | — | 5 | | | |
| 6 | 100 | — | — | 15 | 4.2 | 1230 | 1130 |
| 7 | 100 | — | — | 20 | 3.9 | 1210 | 1110 |
| 8 | — | 100 | — | 15 | 4.3 | 941 | 890 |
| 9 | — | 100 | — | 15 | 4.3 | 999 | 941 |
| 10 | — | 100 | — | 20 | 4.2 | 852 | 827 |
| 11 | — | 100[h] | — | 10 | 4.3 | 1090 | 1010 |
| 12 | Base Copolymer - PP-1 | | | | | 1120 | 1080 |
| 13 | As above - second molding | | | | 4.9 | 1100 | 1060 |
| 14 | Re-extrusion of No. 13 | | | | 5.2 | 1080 | 1010 |

| | TENSILE PROPERTIES 2 in/min. | | | IZOD IMPACT (NOTCHED)[f] | | | GARDNER IMPACT (125 mil Disk) −30° C., J(in-lb) |
|---|---|---|---|---|---|---|---|
| No. | Yld. Str. MPa | Yld. El. % | Brk. El. % | 23° C. J/m | 0°C. J/m | −18° C. J/m | |
| 1 | — | — | — | 135 (3H/PB) | 44 | 29 | 17.2 (152) |
| 2 | — | — | — | 120 (2/3 H) | 45 | 45 | 4.3 (37.6) |
| 3 | 25.2 | 9.2 | >280 | 150 (4H) | — | — | 6.4 (56.2) |
| 4 | 24.3 | 9.9 | 329 | 490 (5PB) | — | — | >8.7 (77) |
| 5 | — | — | — | 450 (3PB; 1NB) | 47 | 31 | 7.0 (62.0) |

TABLE 2-continued

| | | | PRODUCT DATA | | | | |
|---|---|---|---|---|---|---|---|
| 6 | 28.8 | 8.9 | 190 | 98 | — | — | 2.5 (21.8) |
| 7 | 28.2 | 8.4 | 214 | 100 (5H) | — | — | 2.1 (18.9) |
| 8 | 24.2 | 10.2 | >390 | 130 | — | — | 6.0 (53.3) |
| 9 | — | — | — | 110 | 41 | 26 | 8.3 (73.0) |
| 10 | 23.1 | 11.2 | >390 | 320 (4PB) | — | — | 24.2 (214) |
| 11 | — | — | — | 97 | 40 | 29 | 16.3 (144) |
| 12 | — | — | — | 78 | 33 | 25 | 1.4 (12.0) |
| 13 | 27.8 | 7.4 | 169 | 80 | — | — | 1.8 (16.3) |
| 14 | 27.3 | 7.9 | 130 | 75 | — | — | 1.8 (162) |

(a)Modifiers containing both HDPE and LLDPE with possible addition of peroxide concentrate were pre-extruded on a 1-inch Killion extruder (430° F.) unless otherwise indicated. Percent of each polyethylene in the modifier is shown, and 100%w indicates that polyethylene was blended as a separate ingredient in the final product.
(b)HDPE (density = 0.960 and melt index = 2.0 dg/min).
(c)PE-3.
(d)LLDPE-based peroxide concentrate (4.6% w active PX-1 peroxide); added at 1% w basis the polyethylene portion of the product.
(e)Modifier level in final product.
(f)Notched Izod impact strengths were measured in accordance with ASTM D 256 (see footnote g, TABLE 1 for symbol designations).
(g)The polyethylenes were blended as separate ingredients in the final product.
(h)PE-1.

ILLUSTRATIVE EMBODIMENT #3

This Illustrative Embodiment shows that use of an intermediate rubber content (14%w) and a lower flow (higher molecular weight) for the base copolymer (PP-2) resulted in better Gardner falling weight toughness, but Izod impact was not enhanced for mixed polyethylene modification over that of either LLDPE or HDPE alone (compare Nos. 1, 3 and 4 in Table 3). This is explained by the less than optimum 50:50 mixed polyethylene modifier ratio (Illustrative Embodiment #1 shows that 30%w HDPE-70%w LLDPE is best), and possible mixing uncertainties introduced by adding the polyethylenes separately (not as a masterbatch). It should also be noted that a LDPE modifier (No. 2) proved inferior in toughening to LLDPE (No. 4).

The EPR-LLDPE-HDPE masterbatches were prepared by extruding dry mixtures of appropriate compositions on a 1-inch Killion extruder (450° F.; ca. 1000-1600 psi back pressure). These pelletized concentrates were then letdown at 20% w in the PP-3 impact copolymer. In some instances, peroxide was added during modifier extrusion to effect crosslinking.

Table 4 displays results of testing these formulations. The addition of as low as 15 or 20%w EPR to the modifier appears to effect significant enhancements in both Gardner and Izod toughness without materially reducing moduli for these products (compare Nos. 1, 2, 3 to 4). In the latter example, all compositions of concern had LLDPE to HDPE ratios of about 1:1, with the primary difference being the addition of EPR to Nos. 1, 2 and 3 (aside from the more secondary effects of poly-

TABLE 3

| | MODIFIER COMPOSITION(a) | | | MODIFIER | PRODUCT DATA | | | | | | GARDNER IMPACT (125 mil Disk) −30° C. |
|---|---|---|---|---|---|---|---|---|---|---|---|
| | | | | | PRODUCT MELT FLOW | FLEX. MOD. 0.05 in/min MPa | | IZOD IMPACT (NOTCHED)(f) | | | |
| | HDPE(b) | LLDPE(c) | LDPE(d) | CONTENT(e) | | | | 23° C. | 0° C. | −18° C. | |
| No. | % w | % w | % w | % w | dg/min | Tan. | 1% Sec. | J/m | J/m | J/m | J (in-lb) |
| 1 | 100(g) | — | — | 10 } 20 | 3.1 | 1130 | 1080 | 110 (5H/PB) | 44 | 28 | 19.6 (174) |
|   | — | 100(g) | — | 10 | | | | | | | |
| 2 | — | — | 100 | 20 | 2.7 | 917 | 867 | 140 (⅜H/PB) | 55 | 36 | 20.4 (180) |
| 3 | 100 | — | — | 20 | 3.2 | 1220 | 1150 | 110 (4H/PB) | 37 | 22 | 18.2 (161) |
| 4 | — | 100 | — | 20 | 3.4 | 904 | 850 | 190 (⅜H/PB) | 45 | 35 | 29.4 (260) |
| 5 | Base Copolymer - PP-2 | | | 0 | 3.5 | 1060 | 1030 | — | — | — | 2.8 (24.5) |

(a)All polyethylenes were added as separate ingredients in the final product; hence they are each shown as 100% w of modifier to reflect consistency with the other tables.
(b)HDPE (density = 0.960 g/cc and melt index = 2.0 dg/min).
(c)PE-2.
(d)LDPE (density = 0.919 and melt index = 0.25 dg/min).
(e)Modifier level in final product.
(f)Notched Izod impact strengths were measured in accordance with ASTM D 256 (see footnote g, Table 1 for symbol designations).
(g)These polyethylenes were blended separately in the final product.

ILLUSTRATIVE EMBODIMENT #4

In Illustrative Embodiment #4, the benefits of adding low levels of ethylene-propylene rubber (EPR) to mixed polyethylene masterbatches was examined. For convenience and compounding cost minimization, the EPR selected for this work was Polysar's Epcar 306 in its pelletized form. The relatively high ethylene content (ca. 70%w) and low Mooney viscosity (ML 1+8=36 at 100° C.) of this rubber combined to also give good product stiffness retention and ease or rubber dispersion during compounding.

ethylene source or melt index, and modifier crosslinking). In other words, the added EPR seems to augment the base copolymer rubber content. Higher levels of EPR, up to about 70% of the added modifier, would be expected to further enhance toughness, although some loss in stiffness would occur. As with mixed polyethylene modification alone, it was observed that peroxide treatment during masterbatch extrusion directionally improves the notched Izod (23; 0° C.).

As a final item, it is worth noting the low temperature notched Izod toughness of the EPR-LLDPE-HDPE modified products. Product No. 1 exhibits a 0° C. value (120 J/m) that exceeds the room temperature toughness of many commercial impact grades. Furthermore, at −18° C. (0° F.), all the EPR-LLDPE-HDPE modified products tested offer at least twice the Izod strength found (23 J/m) for a commercial super high impact PP.

TABLE 4

| | PRODUCT DATA | | | | | | | |
|---|---|---|---|---|---|---|---|---|
| | MODIFIER COMPOSITON[a] | | | PEROX. CONC | PRODUCT MODIFIER CONTENT[d] | PRODUCT MELT FLOW | FLEX. MOD. 0.05 in/min MPa | |
| NO. | EPR[b] % w | HDPE % w | LLDPE % w | % w[c] | % w | dg/min[e] | Tan. | 1% Sec. |
| 1 | 20 | 40[g] | 40[h] | 1 | 20 | 3.8 | 966 | 935 |
| 2 | 15 | 40[i] | 45[j] | — | 20 | 2.8 | 1000 | 962 |
| 3 | 15 | 40[i] | 45[j] | 1 | 20 | 2.4 | 1040 | 978 |
| 4 | — | 50[i] | 50[h] | — | 20 | 2.8 | 1050 | 993 |
| 5 | Base Copolymer - PP-3 | | | | | 4.2 | 1300 | 1200 |

| | TENSILE PROPERTIES 2 in/min | | | IZOD IMPACT (NOTCHED)[j] | | | GARDNER IMPACT | |
|---|---|---|---|---|---|---|---|---|
| NO. | Yld. Str. MPa | Yld. El. % | Brk. El. % | 23° C. J/m | 0° C. J/m | −18° C. J/m | (125 mil DISK) −30° C., J(in-lb) | |
| 1 | 23.1 | 11.1 | >390 | 630 (5PB) | 120 | 53 | 28.9 (255) | |
| 2 | 25.0 | 10.0 | >390 | 570 (5PB) | 93 | 64 | 29.2 (258) | |
| 3 | 24.3 | 9.4 | 190 | 610 (5PB) | 96 | 60 | 30.4 (269) | |
| 4 | 25.5 | 9.9 | >330 | 490 (5PB) | 53 | 34 | 21.8 (193) | |
| 5 | 27.2 | 9.0 | >390 | 87 | 37 | 22 | 2.0 (18.0) | |

[a]Modifiers were pre-extruded where component concentrations were expressed as percentages less than 100% w. General conditions in masterbatch extrusions were 450° F. melt, 90-100 rpm, 1000-1600 psi back pressure (1-inch Killion).
[b]Pelletized Polysar Epcar 306 ethylene-propylene rubber.
[c]LDPE-based PX-1 peroxide concentrate; added at 1% basis the modifier.
[d]Modifier level in final product.
[e]ASTM D 1238 Cond. L.
[j]Notched Izod impact strengths were measured in accordance with ASTM D256, with the convention that letter symbols stand for: H = hinge break, PB = partial break. Numbers in front of symbols stand for the number of breaks of the indicated type, i.e., the number or fraction of specimens that broke in the manner given.
[g]HDPE (density = 0.960 g/cc and melt index = 2.0 dg/min).
[h]PE-2.
[i]HDPE (density = 0.960 g/cc and melt index = 0.3 dg/min).
[j]PE-4.

What is claimed is:

1. A composition having a melt flow between about 0.5 and about 30 dg/min (ASTM D1238-Condition L), and a high notched impact value, said composition being obtained by blending in the absence of a peroxide 50-96% by weight of an impact-improved propylene-ethylene copolymer, 2 to 45% by weight of a high density ethylene homopolymer, 2-45% by weight of a linear low density ethylene copolymer and 0 to 30% by weight of a rubber selected from the group consisting of ethylene-propylene rubber and ethylene-propylene-diene monomer rubber, wherein:
   (a) said impact-improved propylene-ethylene copolymer has a melt flow (ASTM D1238-Condition L) of about 0.5 to 30 dg/min and an elastomeric propylene-ethylene copolymer content of 5-50% by weight, the copolymer fraction having an ethylene content of 30-95% by weight, which propylene-ethylene copolymer is the product of sequential polymerization of propylene and a propylene-ethylene mixture over a titanium halide-containing coordination catalyst;
   (b) said high density ethylene homopolymer has a density in the range from 0.941 to 0.965 g/cc and a melt index (ASTM D1238 Cond. E) in the range from 0 to 20 dg/min;
   (c) said linear low density ethylene copolymer is the product of polymerization of ethylene with up to 15 mole percent of at least one $C_3$-$C_8$ alpha olefin monomer over a transition metal-based coordination catalyst and which has a density in the range from 0.912 to 0.935 g/cc and a melt index (ASTM D 1238-Condition E) in the range from 0.1 to 16; and
   (d) the weight ratio of high density ethylene homopolymer to linear low density ethylene copolymer is between 80:20 and 20:80.

2. The composition according to claim 1 wherein said linear low density ethylene copolymer is an ethylene-1-butene copolymer.

3. The composition according to claim 1 wherein said sequential propylene-ethylene copolymer has a melt flow (ASTM D1238 Cond. L) between about 4 and 12 dg/min.

4. The composition according to claim 1 wherein said linear low density ethylene copolymer has a melt index (ASTM D1238 Cond. E) between about 1 and 7 dg/min.

5. The composition according to claim 1 wherein said linear low density ethylene copolymer has a density between about 0.917 and 0.925 g/cc.

6. The composition according to claim 1 wherein said rubber is an ethylene-propylene rubber or an ethylene-propylene-diene monomer rubber comprising 30 to 85 weight percent ethylene.

7. The composition according to claim 1 wherein the linear low density polyethylene, high density polyethylene and optionally an ethylene-propylene or ethylene-propylene-diene rubber are pre-combined by melt mixing into a masterbatch.

8. The composition according to claim 7 wherein the masterbatch is partially crosslinked with a peroxide prior to blending with said sequential propylene-ethylene copolymer.

9. The composition according to claim 8 wherein the amount of peroxide employed is between about 150 and 1500 parts by weight per million parts by weight of masterbatch.

10. The composition according to claim 8 wherein said peroxide is 2,5-dimethyl-2,5-bis(t-butylperoxy)hexane.

11. The composition according to claim 8 wherein said peroxide-contacting takes place at a temperature between about 190° C. and 260° C.

12. The composition according to claim 1 wherein said high density polyethylene has a density between about 0.955 and 0.965.

13. The composition according to claim 7 wherein the masterbatch is treated with a dimethyl-polysiloxane fluid at about 1%w based on the weight of masterbatch polyethylene.

14. The composition according to claim 1 wherein the melt index of said high density ethylene homopolymer is between about 0.1 and about 3.

15. The composition according to claim 1 wherein the elastomeric propylene-ethylene content of said impact-improved propylene-ethylene copolymer is between about 15 and about 20 weight percent.

16. The composition according to claim 15 wherein the melt flow of said impact-improved propylene-ethylene copolymer is between about 0.5 and about 12.

17. The composition according to claim 1 wherein the relative amounts of each component are:
   75 to 90% by weight impact-improved ethylene-propylene copolymer;
   3 to 20% by weight high density ethylene homopolymer;
   5 to 20% by weight linear low density ethylene copolymer; and
   2 to 8% by weight rubber.

* * * * *